United States Patent Office 3,336,390
Patented Aug. 15, 1967

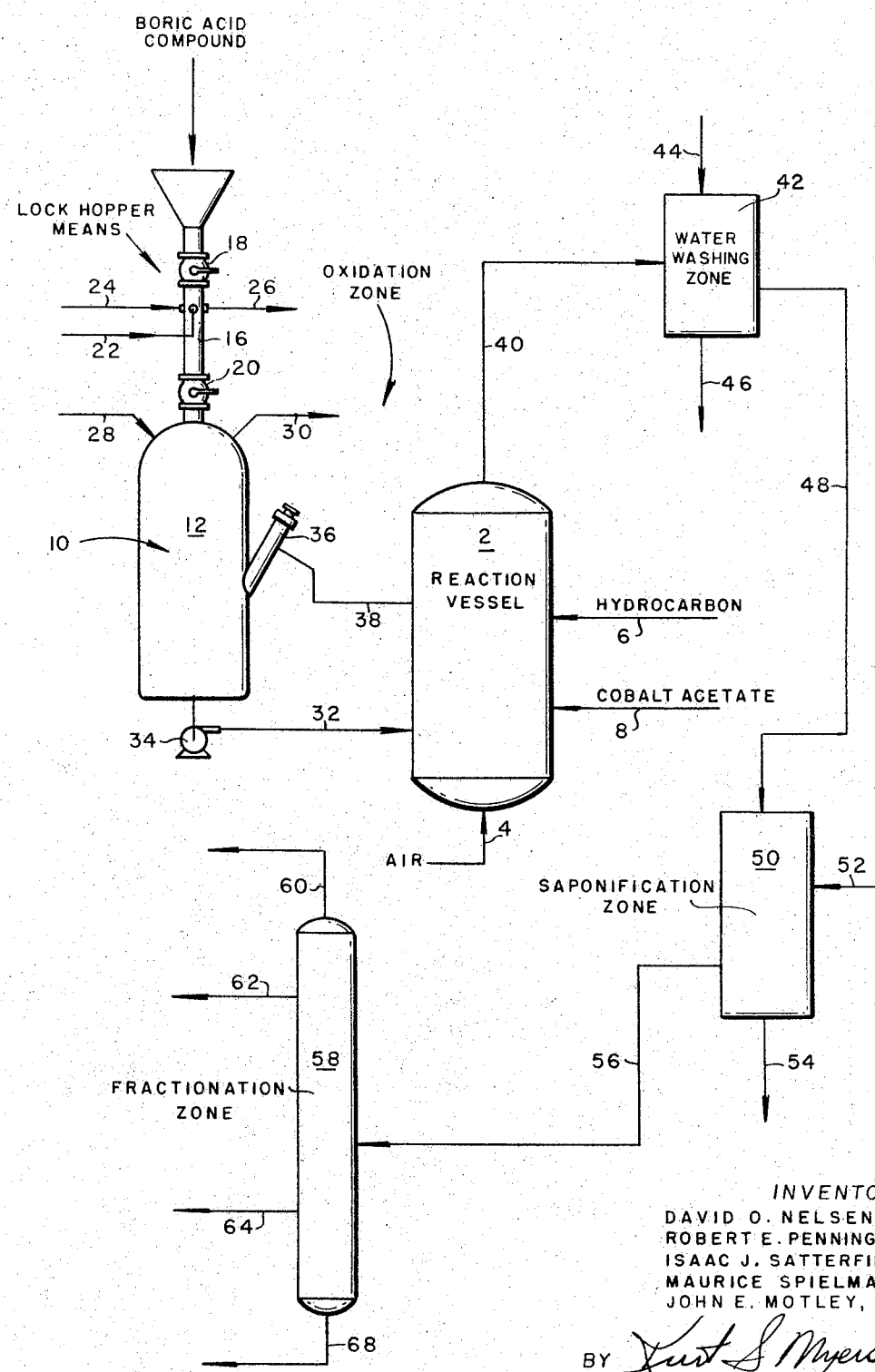

3,336,390
SATURATOR FOR OXIDATION OF
HYDROCARBONS
David O. Nelsen, Robert E. Pennington, Isaac J. Satterfield, and John E. Motley, Harris County, Tex., and Maurice Spielman, New Providence, N.J., assignors to Esso Research and Engineering Company
Filed Oct. 18, 1965, Ser. No. 497,059
7 Claims. (Cl. 260—586)

This application is a continuation-in-part application of Serial No. 181,287, filed Mar. 21, 1962, now abandoned.

The present invention is directed to the oxidation of hydrocarbons in the presence of a boric acid compound. More particularly the invention deals with the manner of adding a boric acid compound to an oxidation reactor means wherein hydrocarbons are oxidized by contact in liquid phase with molecular oxygen. In its more specific aspects the invention is concerned with the addition of a boric acid compound to an oxidation reactor means whereby the oxidation mixture is saturated with the boric acid compound by using a pump-around system from the reactor means to a fixed or confined bed of the solid boric acid compound.

The present invention may be briefly described as a method for adding a boric acid compound to an oxidation reactor means in the oxidation of hydrocarbons wherein the maximum usable amount of boric acid is assured which comprises a pump-around system which pumps the reaction mixture from the oxidation reactor through a confined or fixed bed of the solid boric acid compound.

The oxidation of hydrocarbons in the presence of a boric acid compound is a means to enhance the production of the alcohols formed in the oxidation reaction. However, the useful boric acid compounds are all essentially insoluble in the hydrocarbon starting materials. The present invention is directed to a method for carrying out the oxidation of hydrocarbons whereby the maximum boric acid compound may be added to the reaction mixture. This method is accomplished by passing at least a portion of the reaction products through a saturator vessel containing and confining the solid boric acid compound to dissolve the boric acid compound in the reaction products and passing the boric acid compound enriched reaction products to the reaction vessel. In the oxidation of naphthenes and the low carbon number paraffins where pressure is required to maintain the hydrocarbons in liquid phase, the saturator vessel and oxidation vessel are separated so that the addition of the boric acid compound to the saturator vessel may be expedited. On the other hand, in the oxidation of the higher molecular weight naphthenes and paraffins of carbon numbers above about ten, the oxidation is carried out at atmospheric pressures and in this instance while the saturator vessel and oxidation vessel are functionally distinct, the saturator vessel may be housed within the oxidation vessel.

The present invention will be specifically illustrated by the oxidation of naphthenes to the corresponding cyclic alcohols and ketones.

Cyclic alcohols and ketones are prepared in accordance with the present invention by contacting a naphthene in liquid phase with molecular oxygen in the presence of a boric acid compound. The presence of the boric acid compound enhances the selectivity of the oxidation reaction to the desired oxidation products, i.e., cyclic alcohols and ketones. The greater selectivity is considered to be a result of the boric acid compound reacting with the cyclic alcohol formed in the oxidation to form a borate ester which is resistant to further oxidation. It has further been found that a significant quantity of boric acid compound is required to obtain the maximum selectivity in the oxidation of naphthenes. Only that amount of the boric acid compound which dissolves in the reaction mixture is of any beneficial effect with respect to selectivity since it only is available for the formation of the borate ester. Accordingly, the solubility defines the maximum amount of useful boric acid compound in the reaction mixture. The boric acid compounds used in the present invention are all essentially insoluble in the naphthene feed. To add the boric acid compound in the available solvents would contribute to inherent disadvantages such as the addition of a further feed material, additional materials in the reaction mixture, and purification problems due to removal of the solvent and oxidation products of the solvent, etc. The addition of the solid boric acid compound to the reaction mixture has the inherent disadvantage of handling a solid phase in addition to the liquid and gas phases already present. The present invention is directed to the use of a saturator vessel containing a fixed or confined bed of the boric acid compound through which is pumped the reaction mixture which offers the unique advantage that the maximum usable amount of the boric acid compound is assured. Since the boric acid compounds are soluble in the oxidation products formed in the reaction mixture, the contacting of the boric acid compounds using the pump-around system of the present invention provides maximum saturation of the reaction mixture without any additional feed material or the presence of a solid phase.

The naphthenes used in the present invention may be selected from the $C_3$ to $C_{20}$ cycloparaffins. Readily available naphthenes, which may be utilized in the present invention, are cyclohexane, cyclooctane and cyclododecane. Other naphthenes which may be used are, for example, cyclopentane, cycloheptane, cyclononane, cyclotetradecane, etc.

The naphthene starting material is oxidized in liquid phase with molecular oxygen in the presence of a boric acid compound. The source of molecular oxygen is preferably air. However, it is within the scope of the present invention to use purified molecular oxygen or molecular oxygen diluted to any desired extent with an inert gas such as nitrogen, methane, carbon dioxide, argon, etc. The molecular oxygen is added in amounts sufficient to maintain the oxidation reaction but without excess in the tail gas.

The term "boric acid compound," as used in the present invention, includes boric acid, metaboric acid, boric oxide and other solid boron-containing compounds which generate a boric acid upon contact with water. Thus, a solid boric acid ester-type compound may be used, for example, a cycloalkyl ester of metaboric acid, such as cyclopentylmetaborate, cyclohexylmetaborate, cycloheptylmetaborate, and the like. Preferably the boric acid compound is boric acid, metaboric acid, or the ester of the cyclic alcohol formed in the oxidation and the metaboric acid.

The oxidation reaction is conducted at a temperature within the range of about 100° C. to about 350° C. and at a pressure sufficient to maintain the naphthene in liquid phase; therefore, suitable pressures are within the range of about 10 to 1000 p.s.i.g. The oxidation reaction is preferably carried out at a temperature within the range of about 125° C. to about 250° C. and at pressures within the range of about 50 to about 500 p.s.i.g.

It is further a part of the present invention that the oxidation of the naphthenes may be catalyzed by the use of cobalt acetate. Cobalt acetate is used in the oxidation reaction for decomposition of the intermediate hydroperoxides formed. The choice of cobalt acetate over other cobalt salts such as cobalt naphthenate is significant and important since tarry residues are not formed. It has been found that significantly less cobalt acetate is necessary to maintain the desired p.p.m. level of cobalt since cobalt acetate is a pure crystalline material containing 33 percent cobalt, thus resulting in a substantial reduction in the amount of catalyst residues formed. Although cobalt acetate is oil insoluble, a minor amount of solubilizing agent such as methanol may be added to the oxidation reactor.

The present invention will be further illustrated by reference to the drawing in which:

The sole figure is a flow diagram of a preferred mode.

In accordance with the present invention, the naphthenes are contacted in liquid phase with molecular oxygen in oxidation zone 1. The oxidation zone 1 comprises a reaction vessel 2 and a boric acid compound saturator 10. To the reaction vessel 2 is added the molecular oxygen, preferably air, by line 4 and the naphthene to be oxidized by line 6. Cobalt acetate is added to the reaction vessel by line 8. The feed materials as well as the products formed in the oxidation reaction under the reaction conditions supra, comprises the reaction mixture.

The boric acid compound saturator 10 comprises a saturator vessel 12 which holds the solid boric acid compound during operation. Lock-Hopper means 13 are provided for introducing the solid boric acid compound to the saturator vessel 12 during a continuous operation. The Lock-Hopper means 13 comprises a funnel 14 for introducing the boric acid compound. Quick acting ball valves 18 and 20 separate funnel 14 from the reaction vessel 12 by a flushing zone 16. An inert gas inlet is provided in the flushing zone 16 by line 22, for the introduction of a gas, for example, nitrogen, for preventing air entering while ball valve 18 is open. Accordingly, in the operation of the Lock-Hopper means 13, the boric acid compound is introduced to the filter or funnel 14 and valve 18 is opened. When valve 18 is open, the gas, such as nitrogen, is introduced by line 22. The ball valve 18 is then closed and ball valve 20 opened. The boric acid compound passes through flushing zone 16 into the saturator vessel 12 by introducing a gas or liquid such as nitrogen or a solvent into line 24 to force the boric acid compound into the saturator vessel 12. Ball valve 20 is then closed and the flushing zone 16 may be vented by line 26 and is ready for the introduction of more boric acid compound. The boric acid compound saturator is maintained at a pressure at or near the reactor vessel pressure by introducing an inert gas, such as nitrogen, by line 28. The pressure in the saturator vessel 12 can be maintained by control of vent line 30.

According to the present invention, since the boric acid compound is insoluble in the feed materials in the oxidation of naphthenes, a portion of the reaction mixture formed in reaction vessel 2 is pumped by pump 34 through line 32 to contact the fixed bed of solid boric acid compound in the saturator vessel 12 wherein the reaction mixture becomes essentially saturated, or in other words the maximum amount of boric acid compound dissolves in the reaction mixture. The reaction mixture, after passing through the boric acid compound, passes through a filter means 36 and returns to the reaction vessel 2 by line 38 whereby the oxidation reaction is carried out on a reaction mixture which is essentially saturated with the boric acid compound.

The temperatures in the boric acid compound saturator 10 are maintained at or near the temperature of the reaction vessel 2. The temperature is accordingly maintained in a range from the temperature of the reaction vessel to a temperature of about 20° to 25° F. below the reaction vessel temperature.

In the continuous oxidation of naphthenes as set forth in the drawing, a portion of the reaction mixture is continuously withdrawn by line 40 and passed to a water-washing zone 42. Water is introduced by line 44 wherein the reaction mixture is thoroughly mixed therewith and an aqueous phase and an oil phase are formed and separated. The aqueous phase is withdrawn by line 46 and the oil phase is withdrawn by line 48. The oil phase consists of the desired cyclic alcohols and ketones but also some of the desired cyclic alcohol has reacted with other oxidation products such as to be in the form of organic esters. Accordingly, the oil phase is passed to a saponification zone 50 wherein an aqueous solution of an alkali metal hydroxide is introduced by line 52. The alkali metal hydroxide is preferably sodium hydroxide having a caustic strength of at least 3 percent, although lithium or potassium hydroxide may be used. The hydroxide and the oil phase are thoroughly mixed in saponification zone 50 and a second aqueous phase and second oil phase formed and separated. The second aqueous phase is removed by line 54 and the second oil phase is removed by line 56. The second oil phase is then introduced into fractionation zone 58. The fractionation zone 58 may consist of a fractional distillation tower wherein the light ends and unreacted naphthenes are removed by line 60 and the corresponding cyclic ketone is removed by line 62 and the corresponding cyclic alcohol by line 64. The residue is removed from fractionation zone 58 by line 68.

The present invention is equally applicable in the oxidation of hydrocarbons which are being oxidized to their corresponding alcohol. The oxidation of paraffins to produce the corresponding secondary alcohol is another example wherein the pump-around system of the present invention is advantageous. Further, the present method applies to the oxidation of hydrocarbon mixtures where more than one alcohol is formed. In the oxidation of straight-chained paraffins, a mixture of paraffins having different carbon-numbers will be oxidized with the production of more than one secondary alcohol. The oxidation of $C_{12}$ to $C_{16}$ straight-chain paraffins has been carried out at temperatures between 140° C. and 160° C. using boric acid compounds to enhance the formation of the secondary alcohols. Without the use of the present invention wherein the boric acid compound is confined in the saturator vessel, there has been a problem of dissolving the boric acid compound in the reaction products and serious mechanical problems.

The present invention will be further illustrated by the following specific examples which are given by way of illustration and not as limitations on the scope of the invention.

*Example 1*

Cyclohexane is continuously oxidized in a 4.4 gallon capacity reaction vessel with air in the presence of cobalt acetate as an oxidation catalyst and wherein the reaction mixture is maintained essentially saturated with boric acid according to the present invention. The oxidation is carried out at a temperature within the range of about 140° C. to about 190° C. and at a pressure within the range of about 80 p.s.i.g. to about 300 p.s.i.g. The cyclohexane is introduced at a rate within the range of about 30 to about 70 pounds per hour of which about half is flashed overhead and air is introduced at a rate of about 55 to about 130 standard cubic feet per hour. The cobalt acetate is added periodically to maintain the concentration thereof within the range of about 1 to about 1000 p.p.m. The reaction mixture comprises the feed hydrocarbon and other reactants together with the products formed under the reaction conditions supra. Accordingly, in the oxidation of cyclohexane, the reaction mixture may include cyclohexane (85%), uncombined cyclohexanol (3%), cyclohexanone (5%), uncombined boric acid (<0.5%), cobalt acetate (10 p.p.m.), cyclohexylborate esters (5%), cyclohexyladipate (1%), cyclohexyl formate (0.1–0.5%), cyclohexyl acetate (0.1–0.5%) and other organic cyclohexyl esters (<0.2%). A portion of the reaction mixture is continuously pumped through a saturator vessel containing solid boric acid whereby the reaction mixture contacts the solid boric acid and the reaction mixture becomes saturated therewith. The flow rates of the reaction mixture through the saturator vessel are in the range of about 150 to about 280 pounds of reaction mixture per hour. Preferably, the reaction mixture is pumped through the sautrator vessel at a rate in the range of about 200 to about 250 pounds per hour. The reaction mixture pumped through the saturator vessel has a residence time in the saturator vessel of about 15 minutes to about 45 minutes. Preferably, the residence time is about 30 minutes. The oxidation of cyclohexane is accordingly carried out with the reaction mixture essentially saturated with boric acid. About 0.2 to about 1.5 pounds per hour of boric acid is used to saturate the reaction mixture. Another portion of the reaction mixture is continuously removed and water-washed whereby an oil phase and water phase are formed and recovered. The oil phase is thoroughly mixed with an aqueous solution of sodium hydroxide whereby a second oil phase and a second water phase are formed and recovered. The second oil phase contains the desired cyclohexanol and cyclohexanone which are recovered in pure form by subjecting the second oil phase to a fractional distillation.

*Example II*

Cyclooctane is oxidized using the procedure as set forth in Example I except that the oxidation is carried out at a temperature within the range of about 200° C. to about 300° C. and at a pressure within the range of about 50 p.s.i.g. to about 300 p.s.i.g. The cyclooctane and air are introduced at a rate within the range of about 30 to about 70 pounds per hour and about 50 to about 100 standard cubic feet per hour, respectively. The reaction mixture includes the oxidation products which correspond to those set forth in Example I. The flow rates of the reaction mixture through the saturator vessel are in the range of about 150 to about 300 pounds per hour and the residence time in the saturator vessel is from about 15 to about 45 minutes. The desired products obtained are cyclooctanol and cyclooctanone.

*Example III*

Cyclododecane is oxidized using the procedure as set forth in Example I except that the oxidation is carried out at a temperature within the range of about 275° C. to about 400° C. and at a pressure within the range of about 10 p.s.i.g. and about 200 p.s.i.g. using cyclododecyl metaborate as the boric acid compound. The cyclododecane and air are introduced at rates of about 30 to about 70 pounds per hour and about 50 to about 100 standard cubic feet per hour, respectively. The reaction mixture includes the oxidation products which correspond to those set forth in Example I. The flow rates of the reaction mixture through the saturator vessel are in the range of about 150 to about 300 pounds per hour and the residence time in the saturator vessel is from about 15 to about 45 minutes. The desired products obtained are cyclododecanol and cyclododecanone.

*Example IV*

A mixture of dodecane and tetradecane is oxidized in a reaction vessel with air at a temperature within the range of about 140° C. to about 160° C. and at atmospheric pressure. The reaction mixture which includes 2-dodecanol and 2-tetradecanol is circulated through a saturator vessel containing boric acid.

The nature and objects of the present invention having been completely described and illustrated and the best mode set forth, what we wish to claim as new and useful and secure by Letters Patent is:

1. A process for oxidizing a $C_3$ to $C_{20}$ cycloparaffin to the corresponding cyclic alcohol and ketone which comprises contacting a cycloparaffin in liquid phase with molecular oxygen at a temperature within the range of about 100° C. to about 350° C. and at a pressure within the range of about 0 to about 1,000 p.s.i.g. in a reaction vessel wherein a mixture of reaction products is formed, passing the reaction mixture through a saturator vessel maintained at substantially the conditions in said reaction vessel containing a solid boric acid compound selected from the group consisting of boric acid, metaboric acid, boric oxide, and a cycloalkyl ester of metaboric acid to dissolve said boric acid compound in said reaction mixture, and passing the boric acid enriched reaction mixture back into said reaction vessel.

2. A process in accordance with claim 1 wherein cobalt acetate is added to said reaction mixture as the oxidation catalyst.

3. A process in accordance with claim 1 wherein said cycloparaffin is cyclohexane.

4. A process for oxidizing cyclohexane to cyclohexanol and cyclohexanone which comprises contacting cyclohexane in liquid phase with air at a temperature within the range of about 125° C. to about 250° C. and at a pressure within the range of about 50 to about 500 p.s.i.g. in a reaction vessel wherein a mixture of reaction products is formed, passing the reaction mixture through a saturator vessel maintained at substantially the conditions in said reaction vessel containing a solid boric acid compound selected from the group consisting of boric acid, metaboric acid, boric oxide, and a cycloalkyl ester of metaboric acid to dissolve said boric acid compound in said reaction mixture, and passing the boric acid enriched reaction mixture back into said reaction vessel.

5. A process in accordance with claim 4 wherein the contacting of said cyclohexane with air is carried out in the presence of cobalt actate.

6. In the oxidation of a $C_{12}$ to $C_{16}$ paraffin with molecular oxygen in liquid phase to produce its corresponding secondary alcohol at a temperature within the range of about 100° C. to about 350° C. and at a pressure within the range of about 0 to about 1,000 p.s.i.g. wherein a mixture of reaction products is formed in a reaction vessel, the improvement which comprises passing the reaction mixture through a saturator vessel containing a solid boric acid compound selected from the group consisting of boric acid, metaboric acid, and boric oxide to dissolve said boric acid compound in said reaction mixture, and passing the boric acid compound enriched reaction mixture to said reaction vessel.

7. A process in accordance with claim 6 wherein said boric acid compound is boric acid.

References Cited

UNITED STATES PATENTS

| 1,931,501 | 10/1933 | Luther et al. | 260—617 XR |
| 1,947,989 | 2/1934 | Hellthaler et al. | 260—462 XR |
| 2,223,494 | 12/1940 | Loder | 260—586 |
| 3,232,704 | 2/1966 | Helbig et al. | 260—586 XR |

FOREIGN PATENTS

| 1,166,679 | 11/1958 | France. |

LEON ZITVER, *Primary Examiner.*

M. M. JACOB, *Assistant Examiner.*